United States Patent [19]

Fukuhara et al.

[11] Patent Number: 5,519,298
[45] Date of Patent: May 21, 1996

[54] ABNORMALITY DETECTION METHOD, STABILITY DEGREE DETERMINATION METHOD AND OPERATION CONTROL METHOD FOR MECHANICAL EQUIPMENT

[75] Inventors: Norio Fukuhara; Toshiyuki Ueda; Masaki Hamaguchi, all of Takasago, Japan

[73] Assignee: Kabushiki Kaisha Kobe Seiko Sho, Kobe, Japan

[21] Appl. No.: 357,406

[22] Filed: Dec. 16, 1994

[30]    Foreign Application Priority Data

Dec. 17, 1993  [JP]  Japan .................................. 5-317938

[51] Int. Cl.$^6$ ............................................. G05B 5/01
[52] U.S. Cl. ........................ 318/611; 318/623; 318/601; 318/632; 388/909
[58] Field of Search ...................... 318/611, 587, 318/561, 620, 623, 616, 617, 601, 603; 364/426.04, 438, DIG. 1, 483, 492, 424.02, 474.35, 479.28; 388/904, 909, 912

[56]            References Cited

U.S. PATENT DOCUMENTS

| | | | |
|---|---|---|---|
| 4,503,374 | 3/1985 | Sakano ................................. | 318/561 |
| 4,772,832 | 9/1988 | Okazaki et al. ....................... | 318/587 |
| 4,879,759 | 11/1989 | Tadashi et al. ...................... | 388/904 |
| 4,958,288 | 9/1990 | Takahashi ............................ | 364/426.04 |
| 5,237,511 | 8/1993 | Caird et al. ......................... | 364/483 |
| 5,278,555 | 1/1994 | Hoekman ............................. | 364/438 |
| 5,341,286 | 8/1994 | Inoue et al. ......................... | 363/98 |

*Primary Examiner*—John W. Cabeca
*Attorney, Agent, or Firm*—Oblon, Spivak, McClelland, Maier & Neustadt

[57]            ABSTRACT

The value of a variable reflecting the operating condition of mechanical equipment is continuously detected as operation condition data. A long period average value of the operating condition data detected in long reference period, and a short period average value of data detected in a short analysis period ending in the present time are calculated. Just how much the short period average value differs from the long period average value is adopted as an index of abnormality and using this index, it is possible to ascertain abnormal operating conditions regardless of the absolute value of the variable detected. The above short period average value, long period average value and standard deviation thereof are applied to a first fuzzy membership function for calculating the degree of stability of the mechanical equipment therefrom. Furthermore, the degree of stability is then applied to a second fuzzy membership function for calculating the amount by which the operating parameter of a control factor of the mechanical equipment must be adjusted in order to achieve a desired degree of stability. Thus the mechanical equipment can be controlled for optimum operation.

7 Claims, 7 Drawing Sheets

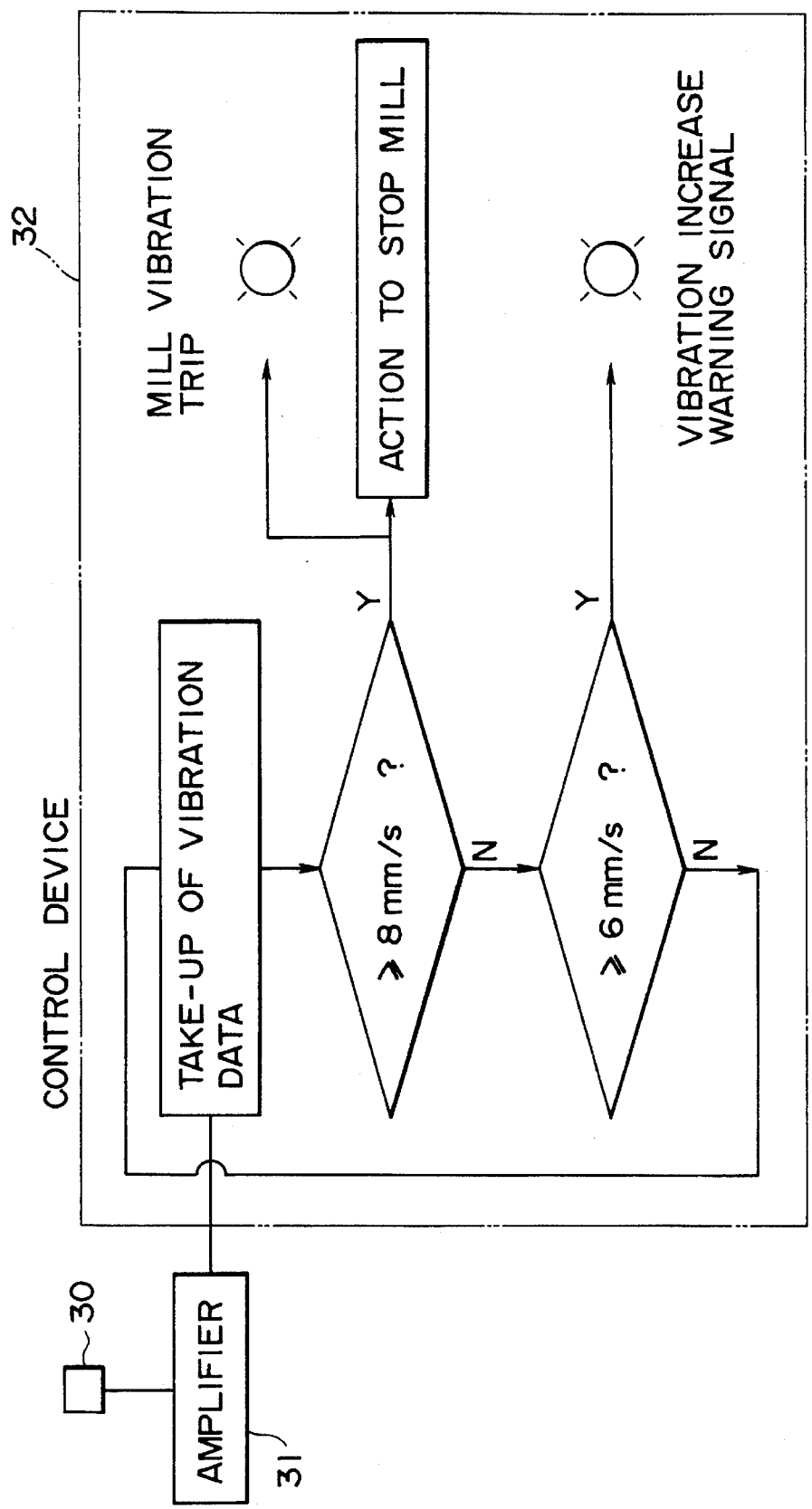

5,519,298

ABNORMALITY DETECTION METHOD, STABILITY DEGREE DETERMINATION METHOD AND OPERATION CONTROL METHOD FOR MECHANICAL EQUIPMENT

FIELD OF THE INVENTION

This invention relates to an abnormality detection method, a degree of stability detection method and an operation control method for mechanical equipment such as roller mills, DJM etc. in which the level of vibration, power consumption, noise etc. varies with changes in the value of loads such as friction acting on the machinery.

DESCRIPTION OF THE PRIOR ART

A prior art method of controlling the operation of a roller mill shall be described as a typical prior art method for controlling the operation of mechanical equipment. This prior art example relates to a control method for detecting and evading abnormal conditions in the operation of a roller mill.

Changes in the condition inside the roller mill attributable to the properties of the raw material can often result in lapses into unstable conditions such as increased vibration and jumps in the electrical consumption of the mill. These unstable conditions can be the cause of reductions in the production quantity through stoppages of the mill, breakdown of the mill itself, and reduction in product quality etc.. It is thus desirable to be able to detect assuredly such unstable conditions and evade them to keep the roller mill running continuously.

In the prior method of controlling the operation of a roller mill shown in the block diagram of FIG. 8, unstable conditions of the roller mill are detected by detecting the level of vibration of the roller mill and measures such as a warning signal or mill shutdown are effected if the vibration exceeds a certain prescribed fixed value.

The vibrations are detected by a pick-up 30 fixed to the roller mill, amplified by vibration amp 31 and then taken up by control device 32. In this example, when the vibration value taken up by control device 32 is equal to or greater than 8 mm/s (vibration trip set point) the roller mill is forcibly stopped and a vibration trip is indicated. Also, when the vibration value is equal to or greater than 6 mm/s but less than 8 mm/s a vibration increase warning signal is effected.

If the mill has to be forcibly stopped, there is the problem that the quality of the product obtained during the first hour after restarting is reduced. Therefore, the operator takes care to effect, in accordance with the above mentioned warning signals, counter measures such as adjustment of the amount of raw material supplied to the roller mill etc. to run the mill such that it is not stopped forcibly.

However, since the average level of vibrations fluctuates with changes in the level of abrasion, the properties of the raw material; thickness of the layer of raw material supplied to the top of the milling table etc., it is not appropriate to control the mill by comparing actual vibration data with a constant fixed reference value.

For example, consider the case when the table is unworn and the average level of vibration is changing at a low absolute value, then even if the properties of the raw material change and vibrations increase, provided that the absolute speed of vibration does not exceed 6 mm/s, a warning signal is not produced and it is not possible to detect the transition of the roller mill to an unstable condition.

Furthermore, under conditions where the abrasion of the table is progressing, it is sometimes the case that the set warning value is set higher in order to prevent the warning signal from being produced too frequently. Taking into account the need to preserve the machinery, this can not be deemed to be desirable.

It is the object of the present invention to provide an abnormality detection method, a degree of stability determination method, and an operation control method which can respectively ascertain abnormal conditions, determine a degree of stability of the operation of mechanical equipment, and control the mill for optimum operation in accordance therewith in a reliable and assured manner.

SUMMARY OF THE INVENTION

According to the abnormality detection method for detecting abnormalities in the operation of mechanical equipment of the present invention the level of at least one variable reflecting the operating condition of the mechanical equipment is continuously detected as operating condition data. Then, (i) a short period average value of operation condition data detected in an analysis period of specified duration ending in the present time, and (ii) a long period average value of operation condition data detected in a reference period ending in the present time of a specified duration longer than that of said analysis period, are calculated from this operation condition data. The short period average value is compared with an abnormality reference value which differs by a specified value from the long period average value to thereby ascertain abnormalities in the operating condition of the mechanical equipment.

In other words, just how much the operating condition data at the present time differs from operating condition data which has the long period average value as it's average value, is taken as an index of abnormality and using this index, it is possible to assuredly detect abnormal conditions regardless of the absolute value of the operating condition data. An abnormality standard value differing by a specific amount from said long period average value is set, and the operating condition of the mechanical equipment is adjudged to be unstable when the short period average value exceeds this abnormality standard value.

According to the degree of stability determination method for determining the degree of stability of the operation of mechanical equipment according to the present invention the level of at least one variable reflecting the operating condition of the mechanical equipment is continuously detected as operation condition data. Then, (i) a short period average value of operation condition data detected in an analysis period of specified duration ending in the present time, and (ii) a long period average value of operation condition data detected in a reference period ending in the present time of a specified duration longer than that of said analysis period, are calculated from this operation condition data. The short period average value and long period average value are applied to a predefined first fuzzy membership function for calculating the degree of stability of said mechanical equipment from the short and long period average values.

In other words, just how much the operating condition data at the present time differs from operating condition data which has Said long period average value as it's average value, is applied to first fuzzy membership function to obtain a numerical value reflecting the degree of stability and by doing so, it is possible to assuredly ascertain abnormal conditions regardless of the absolute value of the operating condition data.

According to the operation control method for controlling mechanical equipment according to the present invention, the level of at least one variable reflecting the operating condition of the mechanical equipment is continuously detected as operation condition data. Then, (i) a short period average value of operation condition data detected in an analysis period of specified duration ending in the present time, and (ii) a long period average value of operation condition data detected in a reference period ending in the present time of a specified duration longer than that of the analysis period are calculated from the operation condition data. Next, these short and long period average values are applied to a predefined first fuzzy membership function for calculating a degree of stability of the mechanical equipment therefrom, and the degree of stability calculated above is applied to a second fuzzy membership function for calculating the amount by which the operating parameter of at least one control factor of the mechanical equipment must be adjusted in order to achieve a desired degree of stability. The mechanical equipment is then controlled n accordance with the output from the second fuzzy membership function.

BRIEF DESCRIPTION OF THE FIGURES

FIG. 8 is a block diagram showing a prior art roller mill control method.

DETAILED DESCRIPTION OF THE EMBODIMENTS

Hereunder, a embodiment of the present invention shall be explained with reference to the attached Figures. The embodiment to be described is just one example of many possible embodiments and is not intended to limit in any way the technical scope of the present invention.

Hereafter embodiments of the abnormality detection method, degree of stability determination method and optimum operation control method as applied to a roller mill shall be described.

Figure 7:
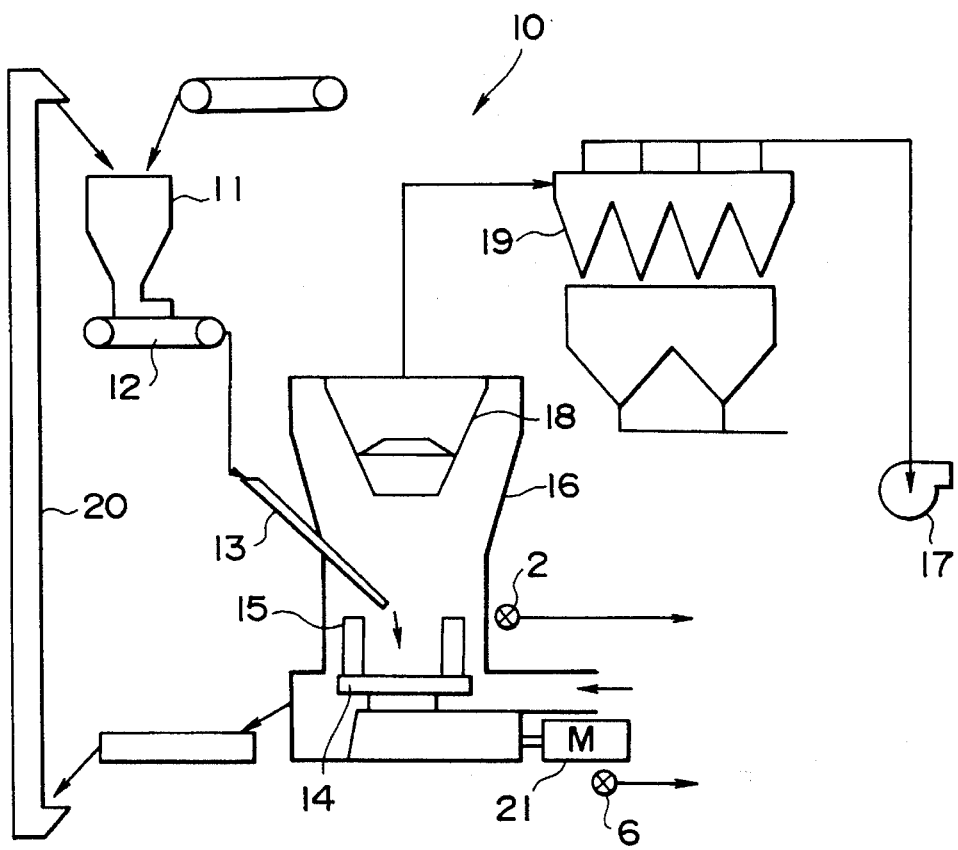
FIG. 7 is a diagram showing the basic construction of the roller mill to which the present invention is applied in the various embodiments

Firstly, the basic structure of the roller mill shall be described using FIG. 7. In roller mill 10, raw material is fed from the raw material supply device onto the table located inside the mill casing and is crushed between the table and the roller. The crushed material is carried outside of the mill casing by a flow of gas where it is accumulated to thereby obtain a crushed raw material product having a desired particle diameter.

In FIG. 7, raw material fed to hopper 11 is transported on conveyor 12, and supplied in a desired amount from the feed opening 13 onto the table 14 located inside the mill casing 16. The raw material supplied onto the table 14 is pressure crushed between the table 14 and rotating rollers 15 working in cooperation with the table 14. The crushed raw material is blown upwards by gusts of hot air directed into the mill casing 16, and is separated into rough and fine grains by separator 18. The fine grains are directed out of the mill casing 16 by the exhaust of exhaust fan 17 and collected as a product in bag filter 19. The rough grains separated out by separator 18 drop down the mill casing and are returned onto the table 14 where they are once again subject to crushing. Any large grains not blown upward by the gusts of hot air, plus any raw material that has spilled over from table 14 are taken out of the mill casing 16 and returned to hopper 11 by basket elevator 20.

The operating condition of the roller mill having the structure described above can be inferred for example, from the detection of the level of vibrations using a vibration pick-up 2 fixed to said roller mill, and/or the mill electrical consumption detected by electric power meter 6 fixed to motor 21 which drives the rotation of the table 14. The operation of the roller mill is controlled by adjusting the operating parameters of control factors of the roller mill in accordance with the detected operating condition data. Examples of such control factors are the amount of raw material supplied by conveyor 12, the amount of exhaust wind provided by exhaust fan 17, and the crushing pressure applied by rollers 15, etc.

Next, the abnormality detection method for detecting abnormalities in the operating condition of the roller mill having the above described structure, shall be explained.

Figure 1:
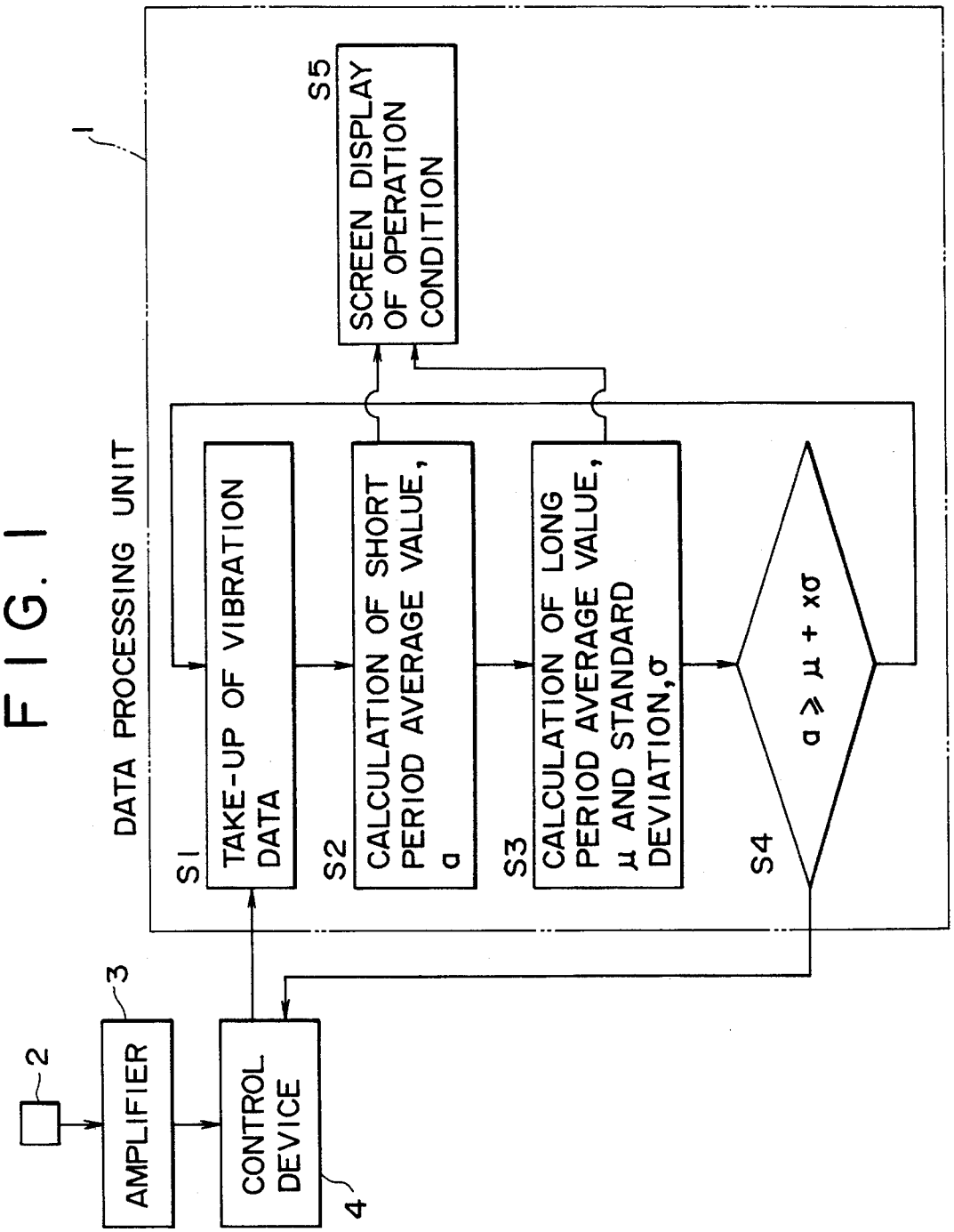
FIG. 1 is a block diagram showing the sequence of steps occurring within a data processing unit used to effect the abnormality detection method of the present invention applied to a roller mill.
Figure 2:
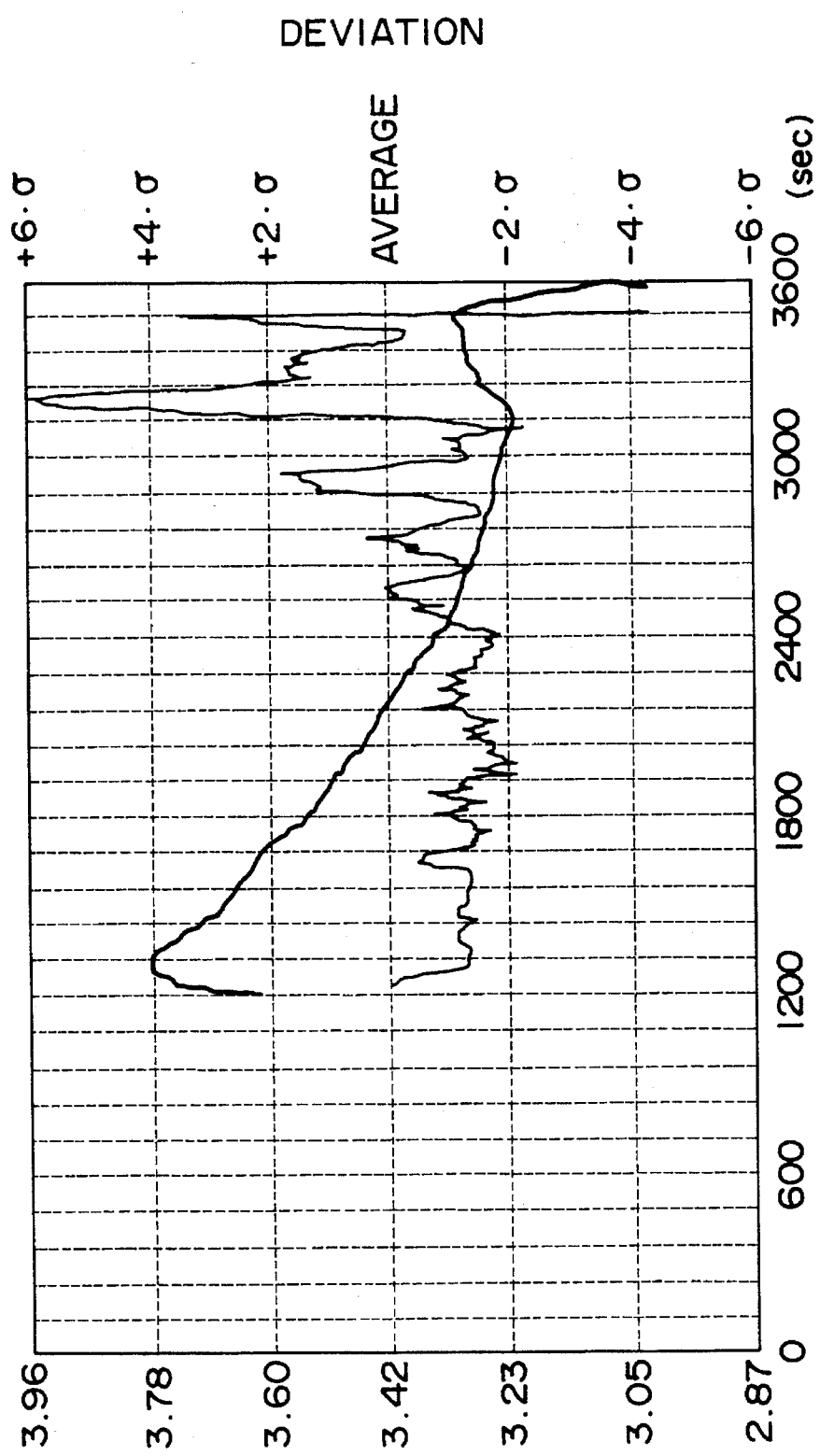
FIG 2 is a graph showing an example of a typical data display showing the operating condition of the roller mill.

FIG. 1 is block diagram showing the sequence of operations occurring inside the data handling device, used to effect the abnormality detection method. FIG. 2 is graph showing an example of a typical data display showing the operating condition of the roller mill.

The level of vibration of the roller mill is detected as data reflecting the operating condition of the roller mill; and abnormal conditions of the roller mill are ascertained from this dam. The vibration data detected by the vibration pick up 2 mounted on the roller mill is amplified by amplifier 3 and then input into control device 4. Control device 4 outputs this vibration data to data processing unit 1.

The procedure of the data processing occurring within the data processing unit shall be explained with reference to FIG. 1. S1, S2, . . . etc. denote the individual steps of the processing procedure.

The level of vibration is measured by vibration pick-up 2 every second, and this data is input into data processing unit 1. In the data processing unit, the vibration data is taken in (S1), and a short period average value, a of the data detected in an analysis period comprising the 60 second period ending in the present time is calculated (S2). Then, a long period average value, $\mu$, of data detected in a reference period comprising the 20 minute period ending in the present time, and the standard deviation thereof, a is calculated (S3). Next, the short term period average value a, is compared with a reference value based on the long period average value, $\mu$, and its standard deviation, $\sigma$, using the equation below (S4), and an unstable condition is ascertained if the below equation (1) is satisfied.

$$a \geq \mu + x\,\sigma \tag{1}$$

In the above equation, x is a set warning parameter preset in accordance with the type of roller mill and the type of operating condition data, The total value of the right hand side of equation (1) is the abnormality reference value. If the above equation is satisfied, control device 4 effects control comprising adjustment of the operating parameters of mill control factors such as raw material feed amount, in order to evade abnormal conditions.

The short period average value, a of the analysis period, long period average value, μ, of the reference period and the standard deviation thereof, σ, calculated in steps S2 and S3 are at each time of calculation indicated on a display screen as data reflecting the operating condition of the roller mill (S5). One example is shown in FIG. 2.

In FIG. 2, the thick line shows the long term period average value, μ, of the reference period beginning 20 minutes previously and ending in the present time. The thin line shows the short term period average value, a of the analysis period beginning 60 second previously and ending in the present time and is drawn to a scale expressed on the right hand vertical axis in terms of the standard deviation, σ, of said long period average value.

As described above, according to the abnormality detection method of the present invention, abnormalities are not ascertained through reference to a fixed set value, but rather, the amount by which the detected data differs from an average level is taken as an index of abnormality and thus changes in the operating condition can be ascertained assuredly regardless of whether the mill is running at a low absolute level of vibration or at a high absolute level of vibration.

In the above described abnormality detection method, the level of vibration of the mill is detected as the operating condition data. However, in the case of a roller mill, it is also possible to ascertain abnormal conditions in the same way by detecting the electric consumption of the motor used to drive the rotation of the roller, or by detecting the thickness of the layer of the raw material on the table.

Next, the degree of stability determination method of the present invention applied to a roller mill shall be described.

Figure 3:
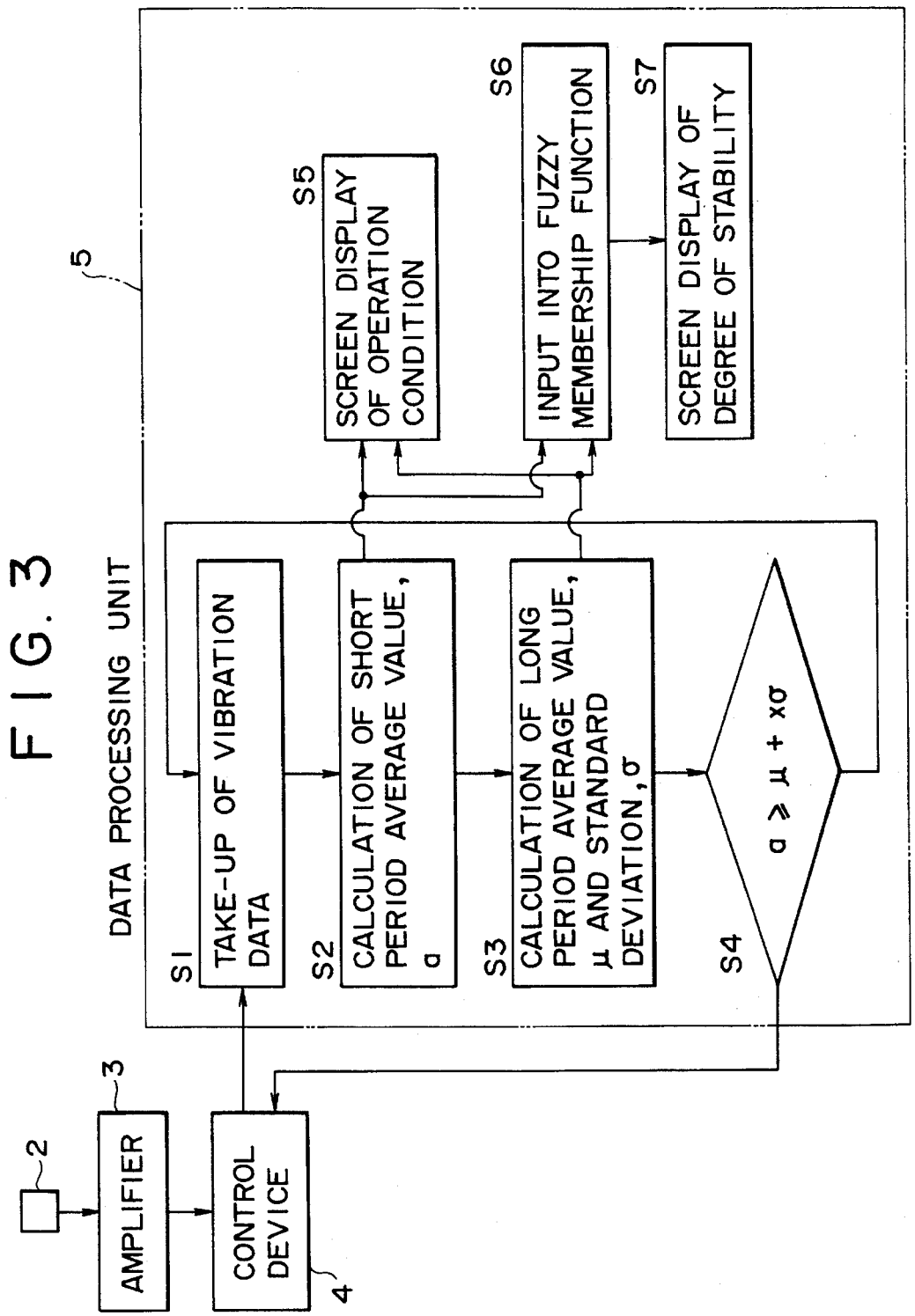
FIG. 3 is a block diagram showing the sequence of steps occurring within a data processing unit used to effect the degree of stability determination method of the present invention applied to a roller mill.
Figure 4:
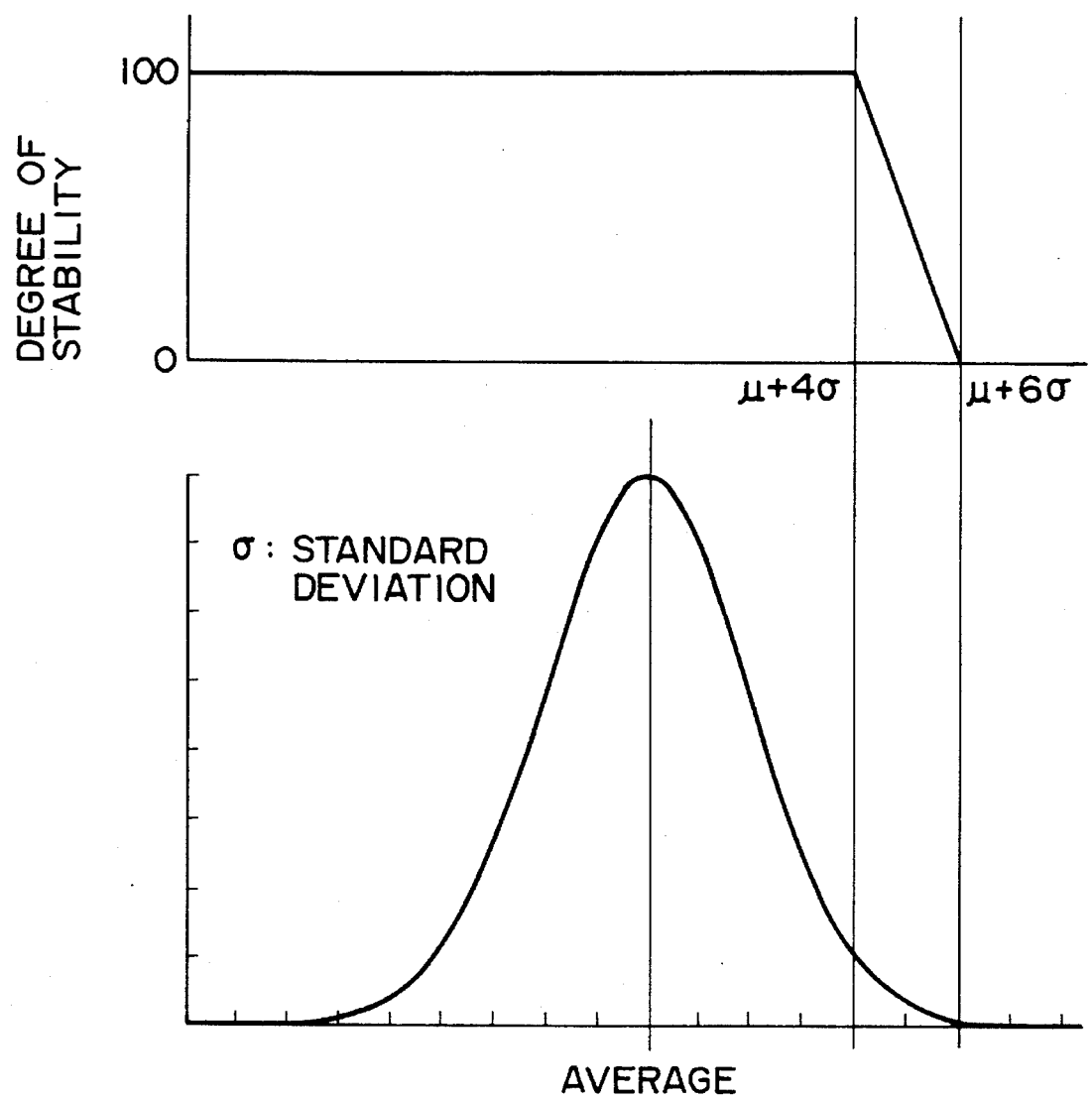
FIG. 4 is a graph showing the fuzzy membership function used to calculate the degree of stability.

FIG. 3 is a block diagram showing the sequence of steps occurring in the data processing unit used to effect the degree of stability determination method applied to a roller mill. FIG. 4 is a graph showing the fuzzy membership function for calculating the degree of stability.

The same reference numbers shall be used, and a detailed explanation omitted, for those elements and steps common to those in the abnormality detection method described above.

The level of vibration of the roller mill is detected as data reflecting the operating condition of the roller mill and the degree of stability is calculated from this vibration data.

Steps S1–S5 are identical to those of the abnormality detection method. In addition to these steps, the short period average value, a of vibration data detected in an analysis period comprising the sixty second period ending in the present time as calculated in step S2, and the long period average value, μ, of vibration data detected in a reference period comprising the twenty minute period ending in the present time together with the standard deviation thereof, σ, as calculated in step S3, are input into a predefined fuzzy membership function (first fuzzy membership function) and the degree of stability is output as a numerical value (S6).

As shown by the graph of FIG. 4, the operating condition is judged to be stable (degree of stability=100) if $a \leq \mu + 4\sigma$; if a is greater than $\mu + 4\sigma$, then the degree of stability is judged to decrease proportionally with the increase in a until the degree of stability reaches a value of 0 for a value of $a = \mu + 6\sigma$.

The thus calculated degree of stability of the operating condition is indicated on the display screen every time it is calculated, as data reflecting the operating condition of the roller mill. (S7)

As described above, according to the degree of stability determination method of the present invention, a fuzzy membership function is used to calculate a degree of stability for the operating condition in the form of a numerical value between 0–100 depending on the amount by which the detected vibration data differs from the average level. Thus it is possible to express changes in the operating condition numerically, regardless of the absolute value of the detected data.

In the above described degree of stability determination method, the level of vibration was detected as operating condition data. However, in the case of the roller mill, it is also possible to determine the degree of stability in the same way by detecting the electric consumption of the motor used to drive the rotation of the table (mill electric power), and/or the thickness of the layer of raw material on the table.

Next, the operation control method of the present invention applied to a roller mill shall be described.

Figure 5:
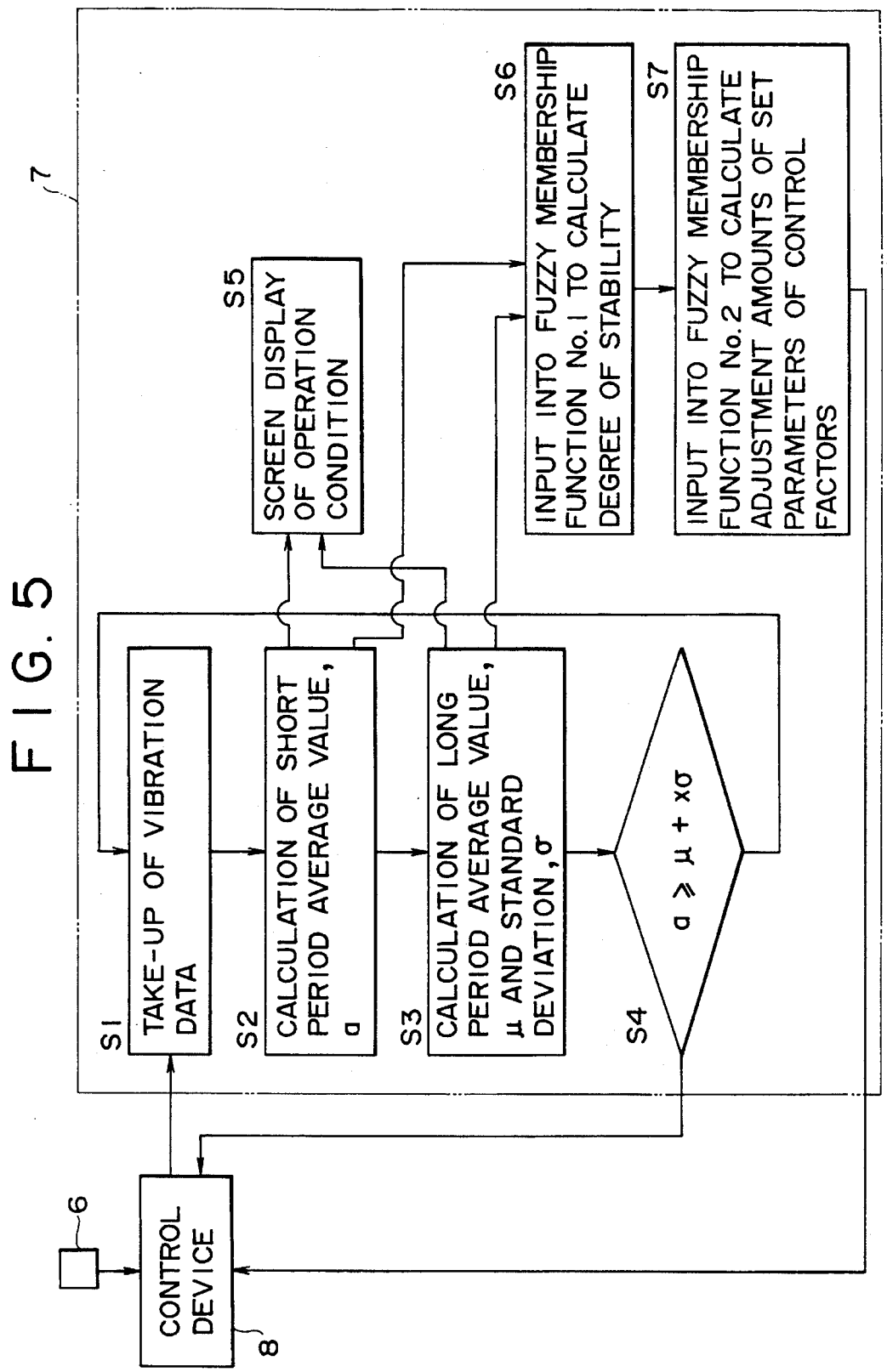
FIG. 5 is a block diagram showing the sequence of steps occurring within the operation control device used to effect the control method of the present invention applied to a roller mill.
Figure 6:
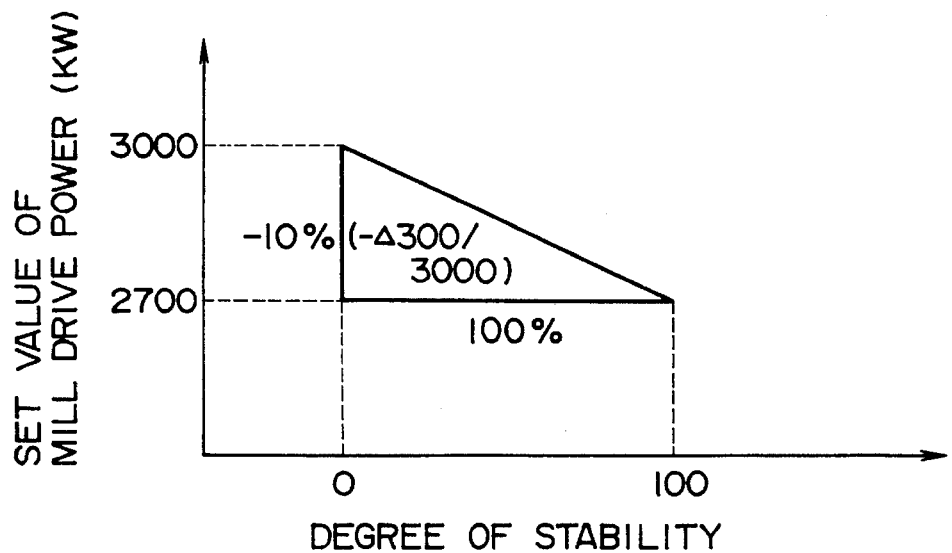
FIG. 6 is a graph of the fuzzy membership function showing the relationship between the degree of stability and the mill electrical power.

FIG. 5 is a block diagram showing the sequence of steps occurring within a data processing unit used to effect the operation control method applied to the roller mill. FIG. 6 is a graph of the fuzzy membership function showing the relationship between mill electrical power and the degree of stability.

When the operating condition of the roller mill is judged to be unstable, the operator may as a typical example reduce the set value of the mill electric power of the mill power PID control loop. This operation is the quickest and most effective way to evade the unstable condition. By doing so one lowers the load on the mill, i.e. one lowers the amount of raw material supplied to the mill and it is possible to return the mill to a stable operating condition.

For example, consider the case when the roller mill is operated at an electrical power value set at 3000 kW. If the mill was then judged to be unstable (i.e. if the mill looks as though it is going to stop), the operator would lower the set value of the electrical power to 2700 kW. In other words, in order to return the degree of stability to 100 from 0, the set value of the mill electrical power is reduced by 10%. If the fuzzy membership function showing this relationship were drawn as a graph, it would look like that shown in FIG. 6. This function may also be expressed by the following equation (2).

$$\Delta\text{degree of stability} = -1000 \times (\Delta\text{set value of mill electrical power/set value of electrical mill power}) \tag{2}$$

Accordingly, it is possible to obtain the change in the set value of the mill electrical power necessary to return the degree of stability to the desired degree of stability.

The degree of stability can be calculated using the degree of stability determination method of the second embodiment, and this calculated degree of stability is input into the fuzzy membership function shown in FIG. 6 and the set value of the mill electrical power is adjusted in accordance with the output from this fuzzy membership function such that the desired degree of stability is achieved. The structure necessary to effect this control is shown in FIG. 5.

In FIG. 5, the vibration speed detected by vibration pick-up 6 is input into control device 8. Control device 8 then outputs the vibration speed data to data processing unit 7. In data processing unit 7, the vibration speed detected every second is taken in (S1), and a short period average value a of the data detected in an analysis period comprising the 60 second period ending in the present time, is calculated. In addition, a long period average value, $\mu$, of the data detected in a reference period comprising a 20 minute period ending in the present time, and its standard deviation, $\sigma$, are calculated (S3). Next, in the same way as described for the first embodiment, abnormalities of the operating condition of the roller mill are ascertained by comparing short period average value a, and a abnormality reference value based on standard deviation, $\sigma$, and a preset warning signal set value X, using equation (1) (S4).

The data calculated in steps S2 and S3, are input into a first fuzzy membership function and the degree of stability is calculated (S6). Then, the above calculated degree of stability is input into a second fuzzy membership function to calculate the necessary change in the set value of the mill electrical power (S7) which is then output to control device 8. The set value of the mill electrical power is adjusted by the amount above calculated, and the supply amount of raw material is controlled through mill power PID control loop.

In the above described optimum control method, vibration speed has been detected as the operating condition data; however, it is also possible to effect control in the same way by detecting the electrical power consumption of the roller mill, and/or the thickness of the layer of the raw material on the table of the roller mill. Furthermore, it is also possible to adjust other control factors such as the pressure applied by the roller, or the amount of exhaust gas generated by exhaust gas fan.

What is claimed is:

1. An abnormality detection method for detecting abnormalities in the operation of mechanical equipment comprising the steps of:

continuously detecting the level of at least one variable reflecting the operating condition of said mechanical equipment as operating condition data; and comparing a short period average value of said operation data detected in an analysis period of specified duration ending at a predetermined time, with an abnormality reference value which is based upon and differs by a specified value from a long period average value of said operation condition data detected in a reference period ending in the predetermined time of a specified duration longer than that of said analysis period, to thereby ascertain abnormalities in the operating condition of said mechanical equipment.

2. The abnormality detection method according to claim 1 wherein said mechanical equipment is a roller mill.

3. The abnormality detection method according to claim 2 wherein said variable reflecting the operating condition of the roller mill is a variable selected from the following group: electrical drive power, speed of vibration of the roller mill, and the thickness of raw material on the milling table of the roller mill.

4. A degree of stability determination method for determining the degree of stability of the operation of mechanical equipment comprising the steps of:

continuously detecting the level of at least one variable reflecting the operating condition of the mechanical equipment as operation condition data;

applying (a) a short period average value of said operation data detected in an analysis period of specified duration ending in a predetermined time, and (b) a long period average value of said operation data detected in a reference period ending in the predetermined time of a specified duration longer than that of said analysis period, to a predefined first fuzzy membership function for calculating the degree of stability of said mechanical equipment therefrom.

5. The degree of stability determination method according to claim 4 wherein said mechanical equipment is a roller mill.

6. An operation control method for controlling mechanical equipment comprising the steps of:

continuously detecting the level of at least one variable reflecting the operating condition of the mechanical equipment as operation condition data;

applying (a) a short period average value of said operation data detected in an analysis period of specified duration ending in a predetermined time, and (b) a long period average value of said operation data detected in a reference period ending in the predetermined time of a specified duration longer than that of said analysis period, to a predefined first fuzzy membership function for calculating the degree of stability of said mechanical equipment therefrom;

applying the degree of stability calculated above to a second fuzzy membership function for calculating the amount by which the operating parameter of at least one control factor of the mechanical equipment must be adjusted in order to achieve a desired degree of stability; and controlling said mechanical equipment in accordance with the output from said second fuzzy membership function.

7. The operation control method according to claim 6 wherein said mechanical equipment is a roller mill.

* * * * *